United States Patent [19]
Mefferd et al.

[11] Patent Number: 5,426,662
[45] Date of Patent: Jun. 20, 1995

[54] LASER SYSTEM SELECTIVELY OPERABLE AT TWO COMPETING WAVELENGTHS

[75] Inventors: Wayne S. Mefferd, Los Altos Hills; William P. Kolb, Redwood City, both of Calif.

[73] Assignee: Coherent, Inc., Santa Clara, Calif.

[21] Appl. No.: 234,474

[22] Filed: Apr. 28, 1994

[51] Int. Cl.$^6$ .............................................. H01S 3/08
[52] U.S. Cl. ........................................ 372/99; 372/107
[58] Field of Search ................ 372/61, 97, 99, 107, 372/108

[56] References Cited

U.S. PATENT DOCUMENTS

| | | | |
|---|---|---|---|
| 3,860,888 | 1/1975 | Stephens | 331/94.5 C |
| 4,378,600 | 3/1983 | Hobart | 372/62 |
| 4,757,507 | 7/1988 | Wondrazek, et al. | 372/23 |
| 4,965,807 | 10/1990 | Guillet et al. | 372/92 |
| 5,048,034 | 9/1991 | Tulip | 372/41 |
| 5,091,911 | 2/1992 | Tulip | 372/4 |
| 5,124,998 | 6/1992 | Arrigoni, et al. | 372/61 |
| 5,272,707 | 12/1993 | Orlando | 372/107 |

Primary Examiner—Rodney B. Bovernick
Assistant Examiner—Robert E. Wise
Attorney, Agent, or Firm—Limbach & Limbach; Michael A. Stallman

[57] ABSTRACT

A laser system is disclosed which is capable of selectively generating radiation at two competing wavelength regions. A gas discharge tube is provided which includes krypton as the lasing medium. A primary mirror is mounted at one of the tube. A switchable mirror assembly is mounted at the other end of the tube. The mirror assembly includes a frame. A cradle is pivotally mounted in the frame and is rotatable between two angular positions. A pair of mirrors are mounted to the cradle in a manner such for each of the two angular positions of the cradle, one of the two mirrors is in optical alignment with discharge tube. Each of the mirrors is provided with a wavelength selective coating which permits operation of the laser at different wavelengths. In the preferred embodiment used for ophthalmic applications, the laser can selectively generate red light or light in the yellow/green regime.

21 Claims, 7 Drawing Sheets ical patent.

LASER SYSTEM SELECTIVELY OPERABLE AT TWO COMPETING WAVELENGTHS

TECHNICAL FIELD

The subject invention relates to an assembly for selectively positioning one of two different resonator mirrors in the optical axis of a laser. The assembly allows the laser to selectively generate two different competing wavelengths.

BACKGROUND OF THE INVENTION

There are many different laser applications where an output having different wavelengths would be desirable. One example is in the field of ophthalmic laser surgery. At the present time, there are a number of different eye problems which can be treated using laser radiation. For example, pan-retinal photocoagulation is often performed to improve the sight of diabetics. In this procedure, portions of the retina are burned to prevent new, weak blood vessels from forming. It has been found that in an eye where the vitreous is clear, this treatment is best performed using green light or light having a wavelength in the 500 to 540 nm regime.

Unfortunately, patients with eye troubles often have other complications. For example, weak blood vessels in the eyes of diabetics often rupture so that hemorrhaging occurs and blood cells are present in the vitreous of the eye. The hemoglobin in the blood cells is highly absorptive of green laser light. Thus, in order to treat a retina were blood cells are present in the vitreous, it is necessary to use red light which will pass through the red colored blood cells.

Still other procedures are best performed using yellow light. Yellow light is desirable because it is highly absorbed in blood and has a short penetration depth behind the retina. Recently, opthalmalogists have begun using yellow laser light to treat macular degeneration.

As can be appreciated, many ophthalmologists would prefer to purchase a single laser system which could be used to treat a wide variety of problems. Accordingly, various manufacturers have developed ophthalmic laser systems which were capable of generating a number of different wavelengths. One example of such a laser system is marketed by the assignee herein under the model number 920 A/K. This laser system includes both an argon and a krypton gas ion laser. The argon ion laser generates most of its light output in the blue/green regions of the spectrum. The predominant output of the krypton laser is at 647 nm, in the red portion of the spectrum. By selectively energizing one of the two lasers, the doctor can choose the wavelength region appropriate for the selected surgical procedure.

In order to provide even further flexibility, the assignee herein markets another ophthalmic laser system (marketed under the trademark Lambda Plus) which includes both an argon laser and a tunable dye laser. In this system, the argon laser is used to generate blue/green light while the dye laser is used to generate a tunable output covering the red and yellow wavelength regimes. This latter laser system provides significant flexibility in the selection of wavelengths.

As can be appreciated, both of the laser systems described above required two lasers in order to achieve the desired wavelength selectability. Although these laser systems are commercially successful, it would be desirable to design a system which would generate a suitable range of wavelengths in a simpler and more cost effective manner.

This goal is achieved with the system of the subject invention which utilizes only a single krypton ion laser discharge tube to generate output in multiple wavelength regions. As noted above, a krypton ion laser typically operates with an output at 647 nm, in the red regime. However, krypton gas also includes significant lasing transitions at 531 nm and 568, in the green and yellow regions respectively. Unfortunately, there is strong competition between the 647 nm line and both the 531 nm and 568 lines. Competition arises when two lasing lines vie for energy at either the upper or lower lasing level. Due to this competition, it is quite difficult to utilize a single krypton laser that could generate sufficient output powers at these different lines to effectively treat a variety of eye diseases. As discussed more fully below, this problem has been overcome using a unique mirror assembly which selectively moves one of two narrow band resonator mirrors into alignment with the laser tube. One of the two mirrors is optimized to allow the laser to generate red light while the other mirror suppresses the red light and allows the laser to operate in the green and yellow wavelength regions.

The general concept of utilizing different wavelength selective mirrors to control the output of a gain medium is not new. For example, U.S. Pat. No. 3,860,888, issued Jan. 14, 1975, to Stephens, discloses a solid state Nd:YAG laser. An output coupler is mounted at one end of the gain medium. The other end of the resonator is defined by a multifaceted mirror mounted on a rotating polygon. Each facet of the mirror has a different wavelength selective coating. By rotating the mirror support, various coated mirrors can be brought into alignment with the gain medium to vary the output wavelength of the laser.

Another approach is described in U.S. Pat. No. 4,757,507, issued Jul. 12, 1988, to Wondrazek. In this Nd:YAG laser system, two mirrors having different wavelength coatings are mounted on a planar support. The output wavelength of the laser is varied by translating the support along an axis perpendicular to the optical axis of the gain medium.

A still further approach for switching laser mirrors is disclosed in U.S. Pat. No. 5,048,034, issued Sep. 10, 1991, to Tulip. In this Nd:YAG system, a pair of wavelength selective mirrors are mounted on a pulley system. The output wavelength of the laser is varied by moving the pulley system which functions to selectively align one of the mirrors with the optical axis of the gain medium.

This general concept was also described by the assignee herein for use with gas ion lasers. This description can be found in U.S. Pat. No. 5,124,998, issued Jun. 23, 1992 to Arrigoni. In the laser system described in this patent, the gain medium is defined by a gas discharge tube. One end of the tube is sealed with a transmissive window. An output coupler is located beyond that window. The other end of the tube is sealed with the high reflector of the resonator. The high reflector is mounted at the end of a flexible bellows. The bellows is provided so that the alignment of the high reflector can be varied from the outside of the sealed enclosure.

In one of the embodiments described in U.S. Pat. No. 5,124,998, (and illustrated in FIGS. 4 and 5), a mirror is shown which is divided into two segments. Each segment is provided with a different wavelength selective coating. Using a set of adjustment screws, the end of the bellows could be laterally translated to bring one of the two segments of the mirror into alignment with the resonator. The output wavelength of the laser was dependent upon which of the two segments was aligned.

U.S. Pat. No. 5,123,998, does not contain any disclosure about the incorporation of such a device in an ophthalmic laser having a krypton gas discharge tube to permit selection of either red or yellow/green output wavelengths. In addition, it has been found that the mechanism shown in the '998 patent has certain drawbacks. More specifically, in the mechanism of the '998 patent, the free end of the bellows is forced to move laterally. This motion creates a significant transverse loading on the bellows. This transverse loading provides a resistance which makes adjustment and stabilization of the segmented end mirror quite difficult. In addition, the transverse loading places a torque on the stem of the discharge tube, adversely affecting alignment. Finally, it is quite expensive to fabricate a single mirror with two regions having different reflectivities.

Therefore, it is an object of the subject invention to provide an improved assembly for selectively moving one of two narrow band mirrors into alignment with an optical resonator.

It is a further object of the subject invention to provide a mirror assembly for connection to a bellows of gas discharge tube capable of selectively moving one of two narrow band mirrors into alignment with the tube.

It is another object of the subject invention to provide an assembly capable of selectively moving one of two optical elements into alignment with an optical axis.

It is a further object of the subject invention to provide a medical laser system having a krypton laser which can be selectively controlled to generate either red or yellow/green output wavelengths.

It is still another object of the subject invention to provide a medical laser system which is simpler in construction than prior art systems, yet provides the ability to selectively switch between different disparate output wavelengths.

It is still a further object of the subject invention to provide a medical laser system which allows the physician to rapidly switch the output between different wavelengths.

SUMMARY OF THE INVENTION

In accordance with these and other objects, the subject invention includes an optical assembly capable of selectively moving one of two optical elements into alignment with an optical axis. In the preferred embodiment, the optical elements are mirrors having wavelength selective coatings which can be used to vary the output of a laser. This assembly is particularly useful for selecting between two competing laser wavelengths.

In the principal embodiment of the subject invention, a laser system is disclosed which includes a gas discharge tube. Flexible bellows are mounted at both ends of the discharge tube. An output coupler is attached to the bellows at one end of the tube.

In accordance with the subject invention, a mirror assembly is connected to the bellows at the other end of the tube. The mirror assembly includes a frame. A cradle is provided which is connected to the end of the bellows. The cradle is also mounted to the frame in a manner such that it is rotatable about a pivot point located in the center axis of the bellows. When the cradle is rotated, the bellows will bend about this pivot point. This bending action produces significantly less torque than if the end of the bellows were translated in the manner described in the '988 patent.

The cradle is movable between two angular positions with respect to the discharge tube. In accordance with the subject invention, the cradle further includes a means for mounting the mirrors such that in each of the two angular position of the cradle, one of the two mirrors is aligned with the optical axis of the laser. In the preferred embodiment, the mounting means is defined by a pair of angled mounting surfaces to which the mirrors are directly attached.

In the preferred laser system, one of the mirrors is provided with a coating optimized to reflect red light. The other mirror is provided with a coating optimized to suppress lasing in the red wavelengths and optimize reflection of the green and yellow wavelengths. The rotation of the cradle is achieved using a processor controlled motor. The user can merely select the desired output wavelength and the cradle will be driven into the optimum angular position.

In the preferred embodiment, the frame carrying the cradle is kinematically mounted to a support plate. The support plate is in turn mounted to the structure supporting the gas discharge tube. Additional motors are providing for adjusting the angle of the frame with respect to the support plate to optically align the cradle with respect to the axis of the tube. Various flags and detectors are provided to allow the system to be easily calibrated and adjusted.

Further objects and advantages of the subject invention will become apparent from the following detailed description taken in conjunction with the drawings in which:

DETAILED DESCRIPTION OF THE PREFERRED EMBODIMENT

Figure 1:
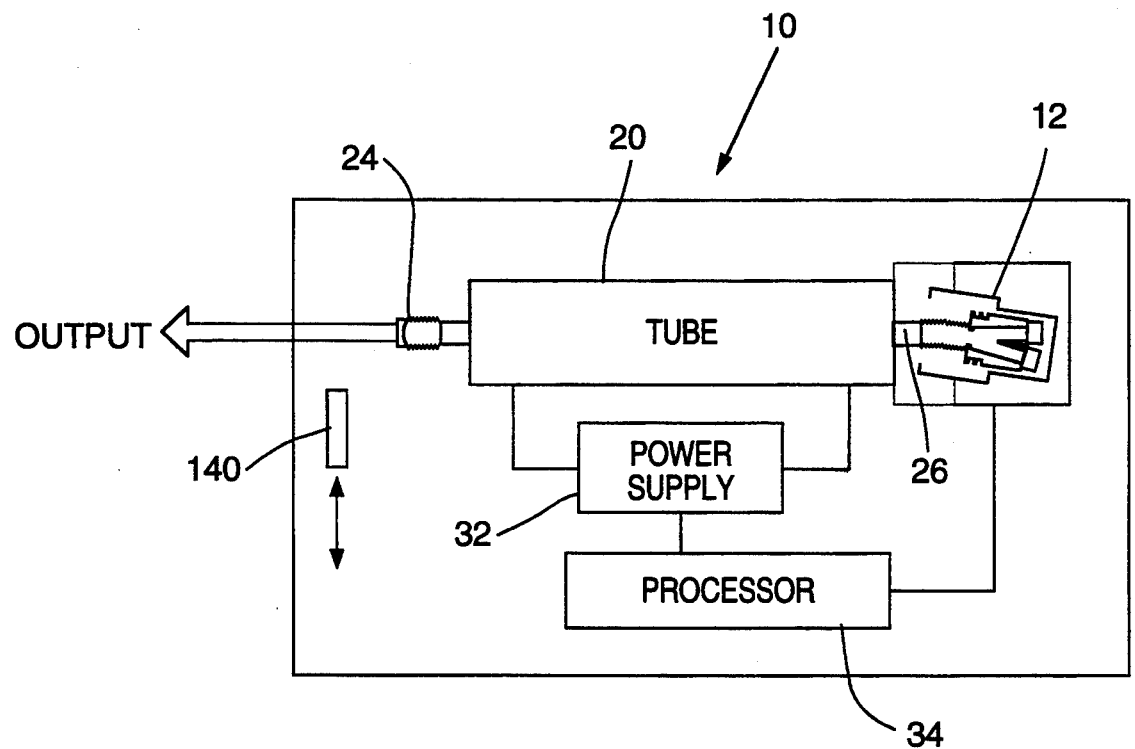
FIG. 1 is a schematic diagram of an ophthalmic laser system formed in accordance with the subject invention.

Referring to FIG. 1, there is illustrated an ophthalmic laser system 10 which utilizes the switching mirror assembly 12 of the subject invention. The system 10 includes a gas discharge tube 20. Projecting out of each end of the tube is a stem 26. Connected to each stem is a flexible bellows 28. At one end of the tube, a mirror 24 is provided which is mounted to the end of the bellows and serves as the output coupler. The flexible bellows allows the angular orientation of mirror 24 to be adjusted in the manner disclosed in U.S. Pat. No. 5,124,998, cited above. As discussed below, the mirror assembly 12 of the subject invention is connected to the bellows 28 at the other end of the tube 20 as discussed in detail below.

Tube 20 is formed from alumina and has an internal structure of the type described in U.S. Pat. No. 4,378,600. This type of ion laser tube is marketed by the assignee herein under the trademark Innova. Tube 20 contains a lasing gas which, in the preferred embodiment, is Krypton. The gas is excited with a power supply 32. The power supply 32 and the mirror switching assembly 12 are both under the control of a processor 34. The processor is programmed to allow the user to easily switch between two different wavelength regions.

Figure 2:
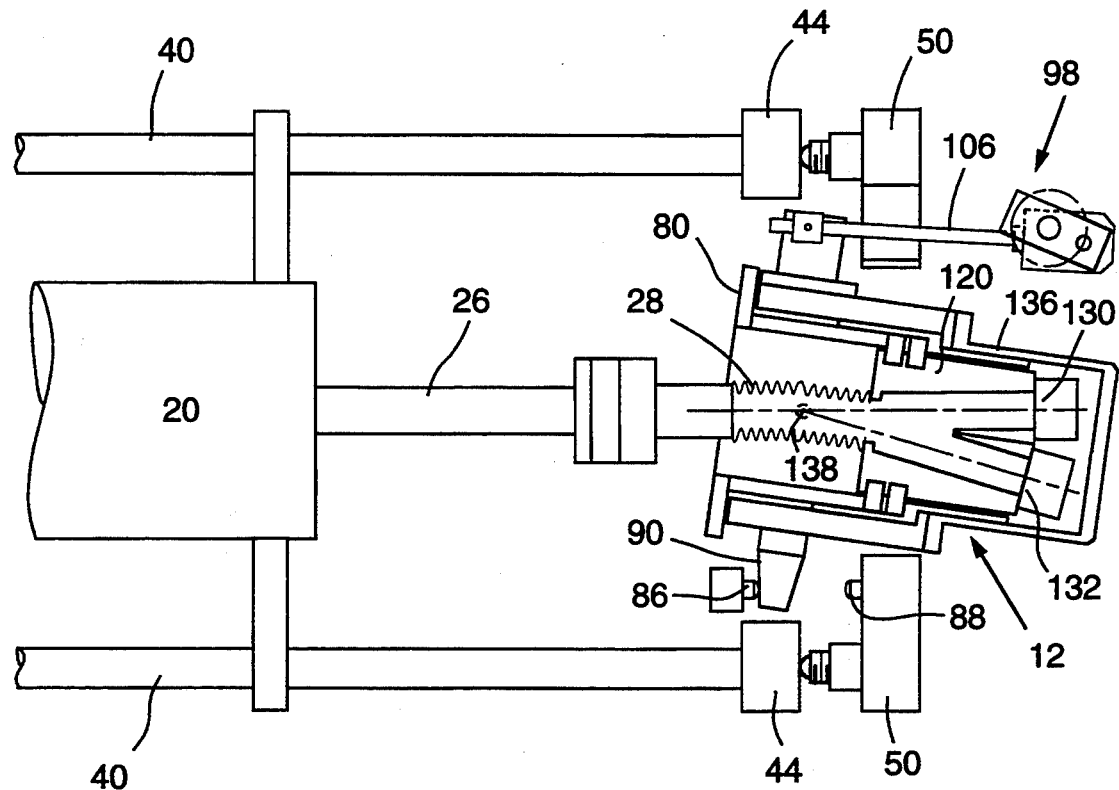
FIG. 2 is a top plan view, partially in section, of a gas discharge tube having the switchable mirror assembly of the subject invention attached thereto.

As illustrated in FIG. 2, tube 20 is supported by a plurality of Invar rods 40. Invar is a material which has significant strength and a low coefficient of thermal expansion and provides stability to the tube. A support plate 44 is mounted at the ends of the Invar rods. The assembly 12 of the subject invention is kinematically mounted to the plate 44. As discussed below, the position of assembly 12 can be varied in both the X and Y axes with respect to the plate 44 to permit alignment. In addition, during assembly, the tube 20 can be rotated with respect to the Invar rods 40 to provide another option for optimizing the optical alignment of the system.

Figure 3:
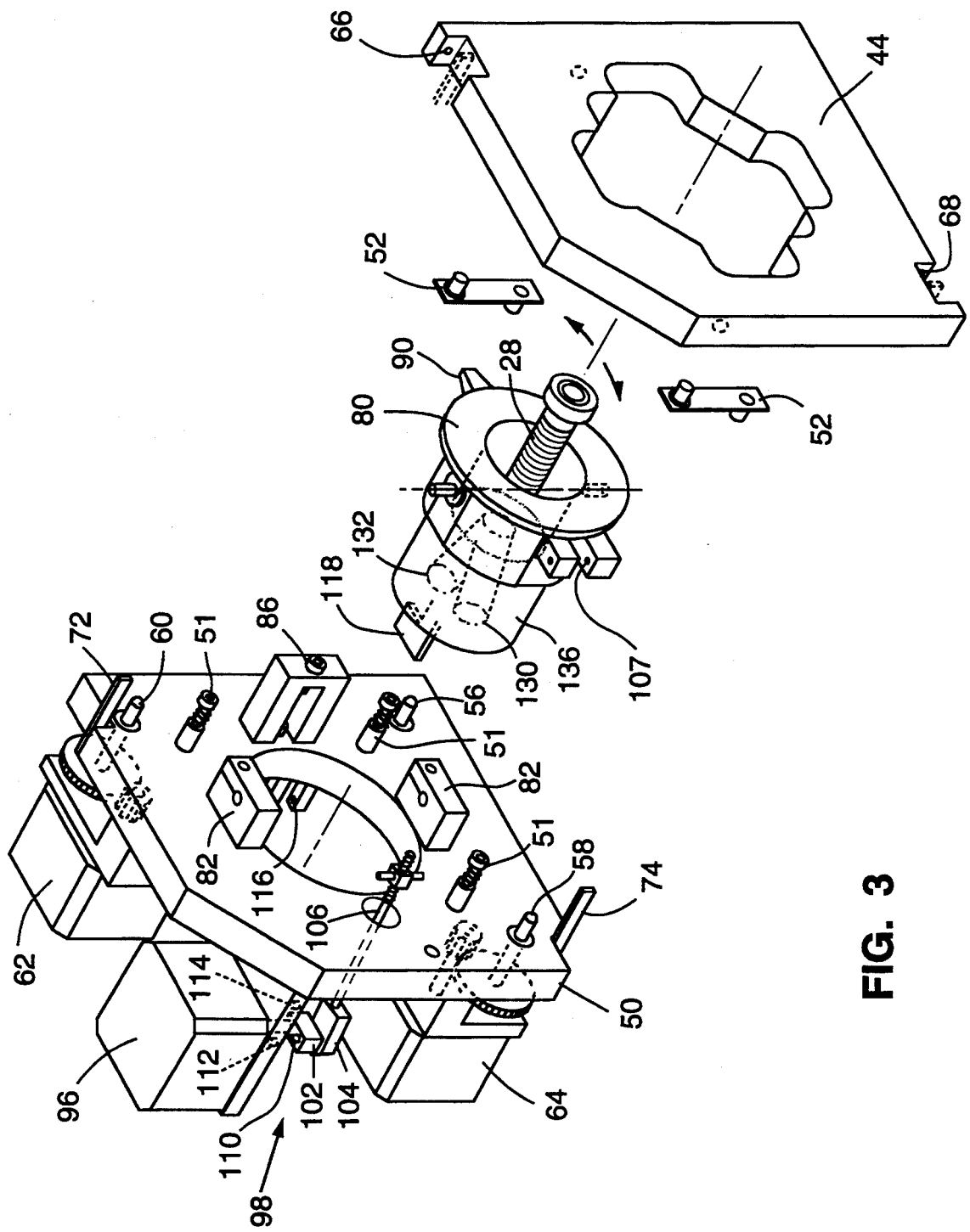
FIG. 3 is an exploded perspective view of the mirror assembly of the subject invention.
Figure 4:
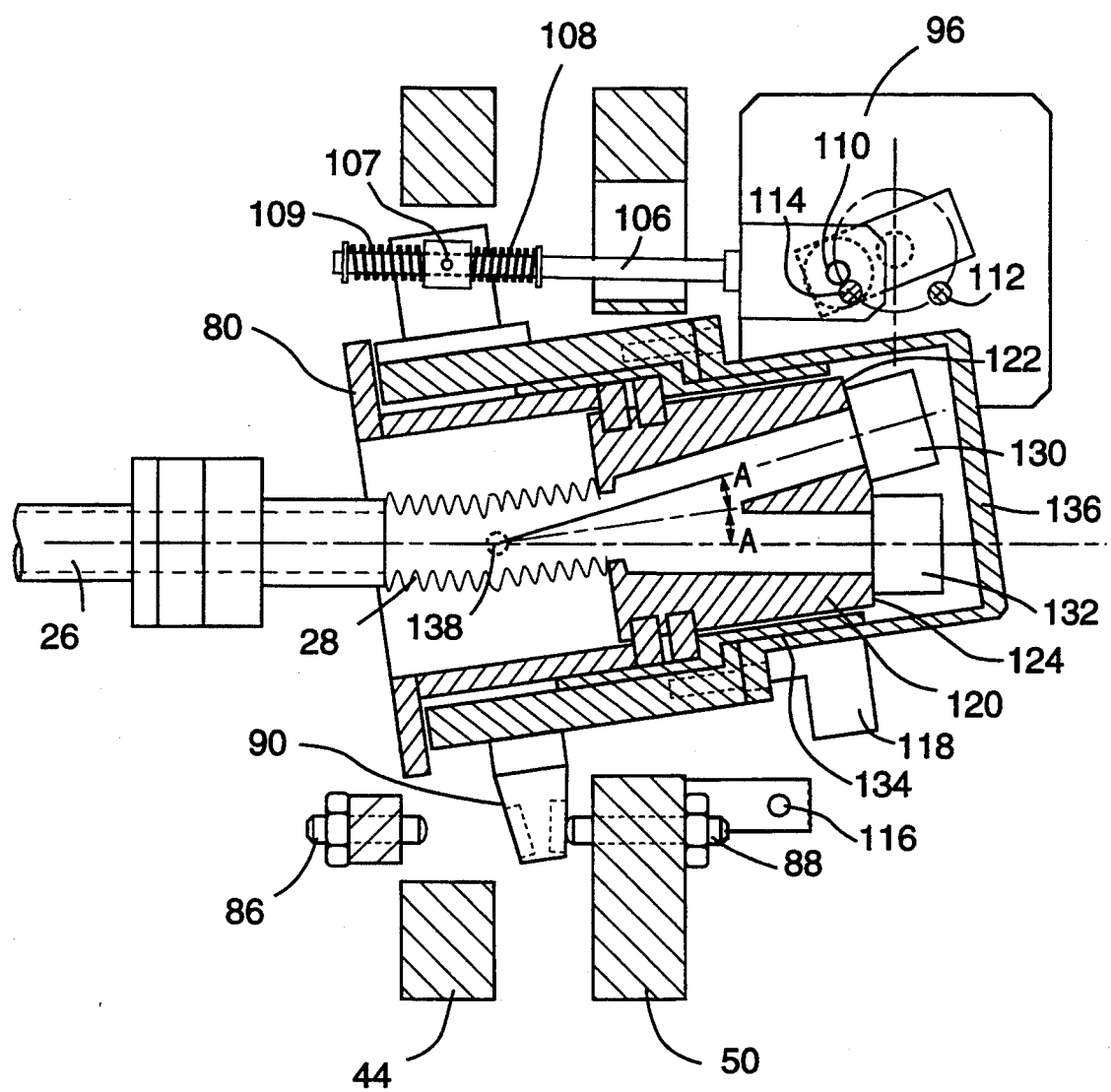
FIG. 4 is a top plan view, partially in section, of the mirror assembly of the subject invention where the cradle is shown in the first angular position.
Figure 5:
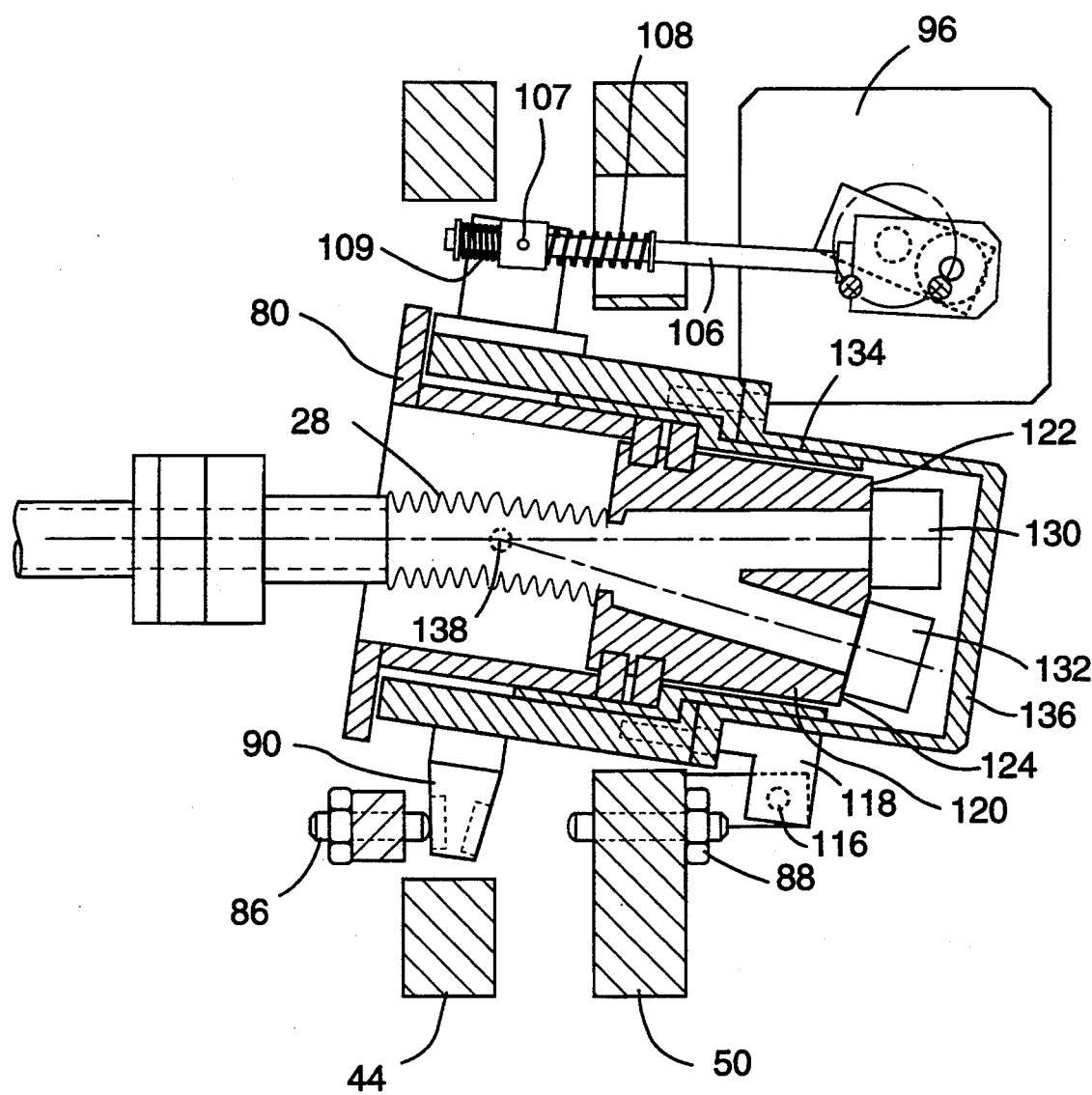
FIG. 5 is a top plan view, similar to FIG. 4, where the cradle is shown in the second angular position.
Figure 6:
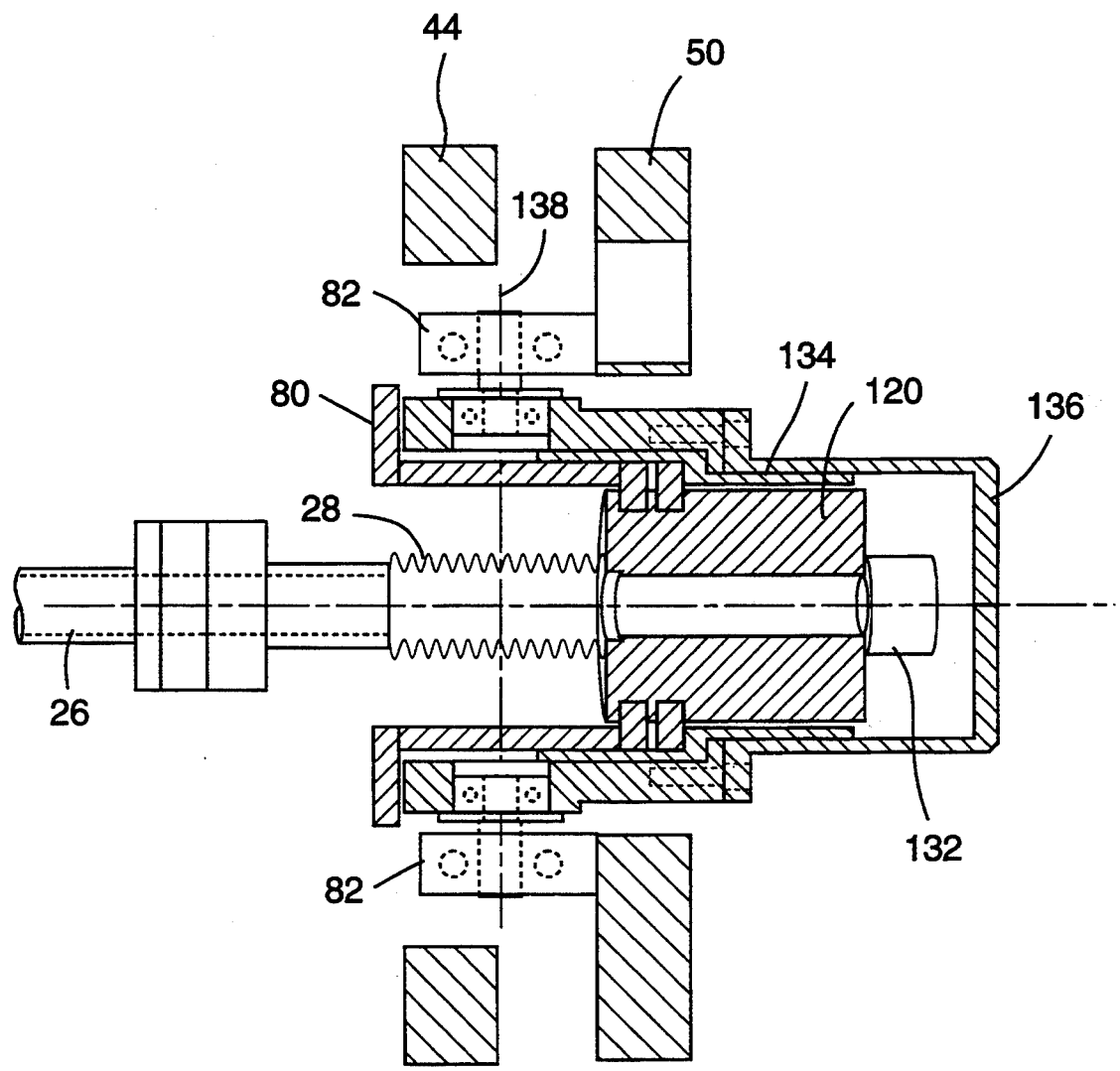
FIG. 6 is a side view, partially in section, of the mirror assembly of the subject invention.
Figure 7:
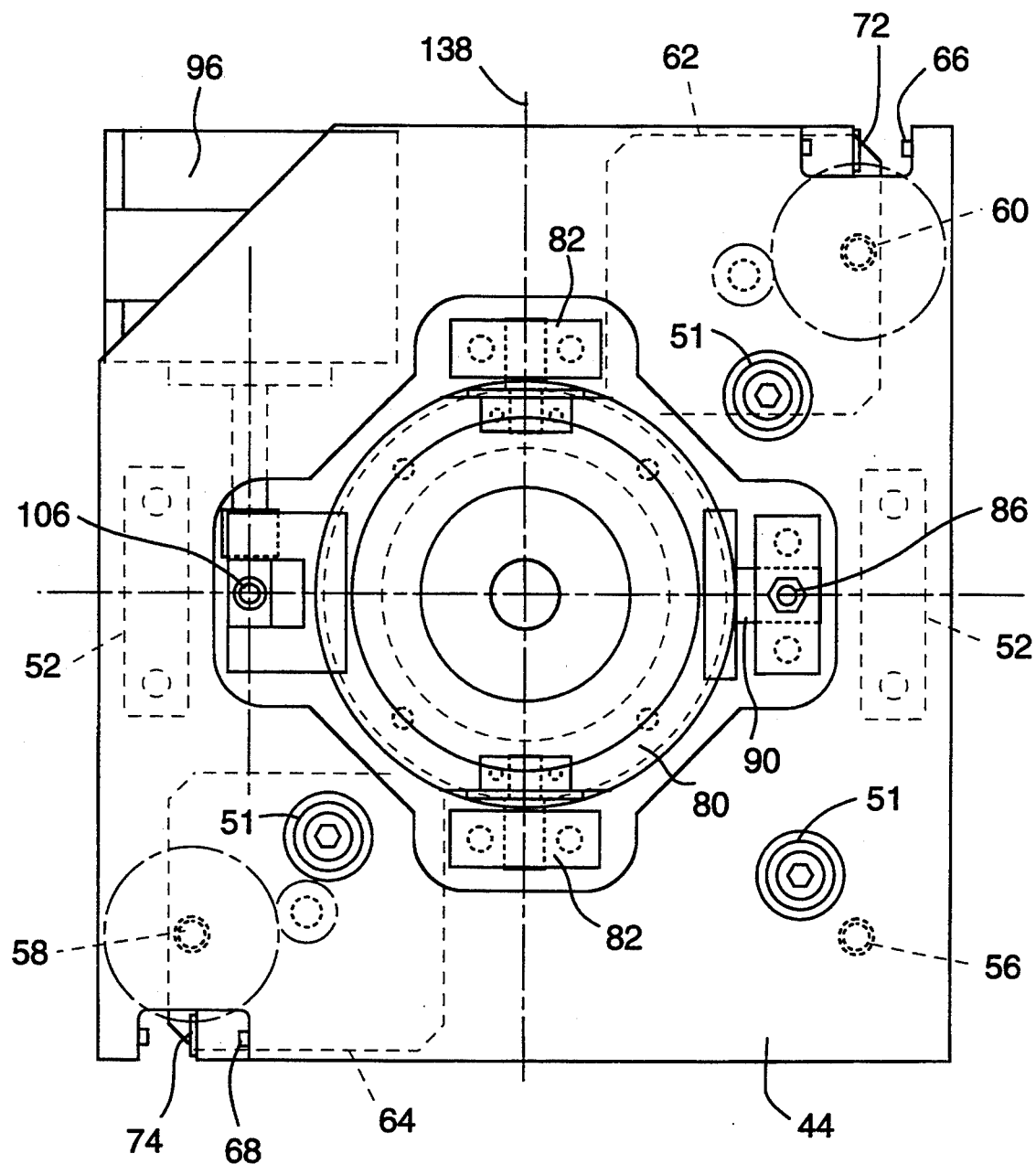
FIG. 7 is an end elevational view (as seen looking from the right hand side of FIG. 3) of the mirror assembly of the subject invention.
Figure 8:
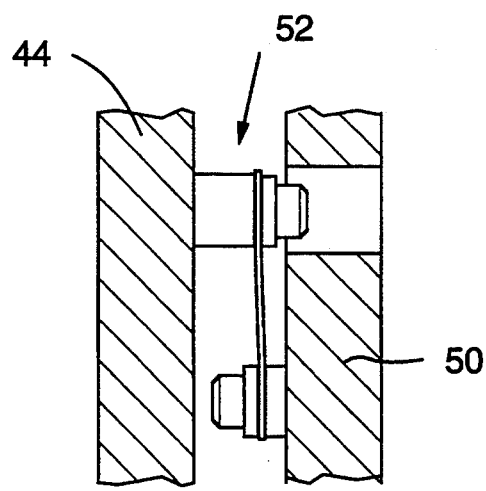
FIG. 8 is an enlarged view of the mechanism for mounting the frame to the plate.
Figure 9:
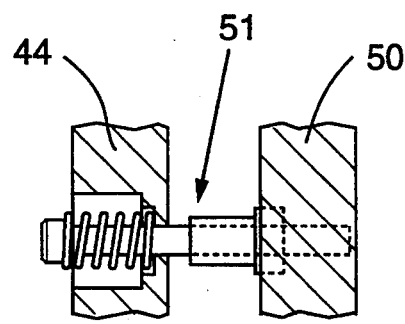
FIG. 9 is an enlarged view of the mechanism used to spring load the frame with respect to the plate.
Figure 10:
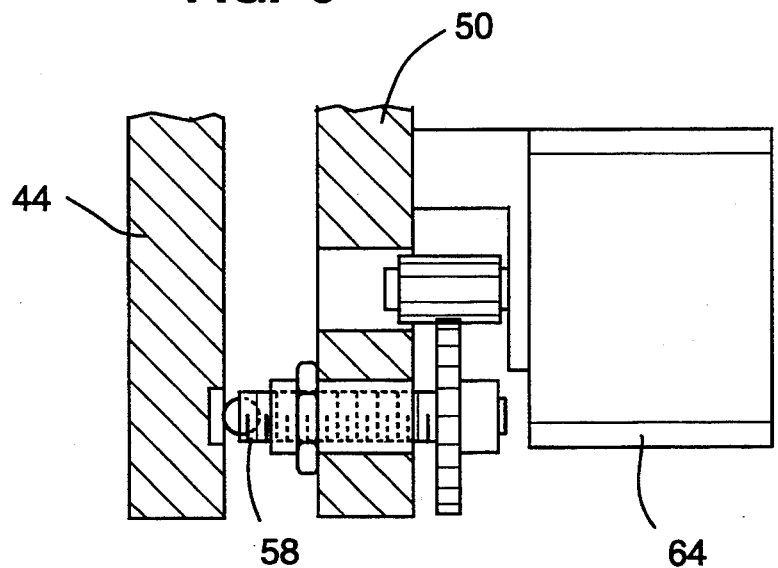
FIG. 10 illustrates the mechanism for angularly adjusting the frame with respect to the plate.

Turning now to FIGS. 3 to 5, the details of the assembly 12 will be described. As can be seen, assembly 12 includes a frame 50. Frame 50 is connected to and spring loaded against plate 44 by spring loaded screws 51 (FIG. 9). Leaf spring assemblies 52 (FIG. 8) are provided to allow the angular position of the plate 44 to be adjusted with respect to the frame 50. The angular position of the plate 44 with respect to the frame 50 is adjustable about a fixed pivot 56. A pair of adjustable set screws 58 and 60, each having a point contact, are provided to adjust the X and Y orientation of the frame with respect to the plate.

Kinematic mounts of the type described above are conventional in the art. However, in this preferred embodiment, the throw of the set screws 58 and 60 are independently controlled by stepper motors 62 and 64 respectively. Stepper motors are under the control of the processor and allow automatic alignment of the mirror assembly. Adjustment is facilitated by providing an optical feedback device for each axis. As seen in FIG. 3, a first LED emitter detector 66 is provided in the upper corner of plate 44 and a second detector 68 is provided in the opposed lower corner. A pair of flags 72 and 74 are mounted to and axially project from frame 50. The flags are positioned so that they partially interrupt the output of the diode of the detector. The detector is sufficiently sensitive so that a mid-point position can be determined within ±0.5 mm. In this manner, the assembly can be aligned by a technician and electronics can be used to return the assembly to the starting alignment.

In accordance with the subject invention, assembly 28 is used to support a pair of mirrors and functions to selectively align one of the mirrors with the optical axis of the laser. To achieve this goal, a cradle 80 is provided which is pivotally mounted to the frame. The pivotal mounting includes a pair of brackets 82 which project into an opening in the plate 44. In this manner, the axis of rotation of the cradle falls at about the midpoint of the bellows 28. The cradle is movable between the two angular positions shown in FIGS. 4 and 5. The extent of the rotational movement is controlled by a pair of adjustable stops 86 and 88 which bear on a member 90 projecting out of the side of the cradle 80. In the preferred embodiment, the cradle is movable through a total of about 17 degrees or 8.5 degrees away from the cradle center position in either direction.

The rotation of the cradle is driven by a stepper motor 96 which is coupled to the cradle via linkage 98. Linkage 98 includes a first block 102 which is eccentrically connected to a second block 104. A rod 106 projects out of block 104 and is connected to the cradle via a pivotal mount 107. A pair of springs 108 and 109 are journaled on the rod 106 on either side of the pivotal mount 107.

The linkage functions to put a relatively straight driving action on the cradle as it forces the cradle against the bias of the springs 108 and 109. Block 98 further includes a projecting member 110 which interacts with stops 112 and 114. In operation, the linkage will move the cradle to its extreme position and the blocks will continue to rotate (using play created by the springs) until the projection 110 hits one of the stops, essentially locking the cradle in place. The stops are located so as to allow the rod to rotate past center in both directions. The spring force will then tend to force the linkage into the locked position even if the motor is not energized.

It is also desirable to provide a means which generates a signal identifying the angular position of the cradle. This goal is achieved by providing a LED emitter detector 116 on the rear of frame 50. A flag 118 projects rearwardly from the cradle and intersects the detector. The output from the detector can be used to determine the angular position of the cradle.

In accordance with the subject invention, the cradle further includes a means for mounting the optical elements so that one of those elements will be optically aligned at each of the two angular position of the cradle. In the preferred embodiment, cradle 50 includes a hollow mount 120. One end of mount 120 is vacuum sealed to the end of the bellows 28. The other end of the mount includes a pair of angled mounting surfaces 122 and 124. The angle of the mounting surfaces is selected so that when the cradle is in either of its extreme angular positions, one surface will be substantially perpendicular to the optical axis of the laser. In the illustrated embodiment, the angles A (shown in FIG. 4) between the center axis of the cradle and a normal to either mounting surface 122, 124 is 8.5 degrees, equal to the half angle of rotation of the cradle.

A pair of mirrors 130 and 132 are connected to the mounting surfaces 122 and 124 respectively. By properly selecting the angle of the mounting surfaces, the reflecting surface of one of the two mirrors will be in optical alignment with the resonator at each of the two angular positions of the cradle.

As noted above, mount 120 is connected directly to the bellows 28 which is in electrical communication with the cathode of the gas discharge tube and will therefore float at some non-zero potential. On the other hand, the frame 50 and cradle 80, which are connected to the support structure are at ground potential. To avoid any shorts, mount 120 is electrically isolated from the cradle by a layer of plastic insulation 134. Cap 136 is mounted over the mirrors to prevent the user from receiving a shock from the mirrors.

The subject assembly has a number of advantages over the prior art systems. First, since only a pivoting action is required rather than a linear translation from one mirror to another, the assembly is very compact. In addition, the angular rotation of the cradle minimizes the transverse force loading transmitted to the bellows and the stem which occurs when the end of the bellows is translated as described in U.S. Pat. No. 5,124,998. As can be seen in FIGS. 4 and 5, in this new design, the bellows is rotated about a pivot axis 138 which creates only minimal side loading. Any resistance from the bellows is transmitted back through the cradle 80, frame 50 and plate 44 to the rigid Invar support bars 40. In tests, it has been shown that the subject assembly can accurately and easily switch from one mirror to the other mirror in under one second.

In the preferred embodiment, wherein the assembly 12 is used in an ophthalmological laser system 10, mirrors 130 and 132 are high reflectors and are provided with narrow band optical coatings to allow wavelength selection. More specifically, mirror 130 is provided with a coating which is optimally reflective of red light and transmissive of yellow and green light. Conversely, mirror 132 is provided with a coating which is transmissive to red light and reflective of light in the yellow and green regimes. Such narrow band optical coatings are typically formed from quarter wave, dielectric stacks. The design of such coatings are well known in the art and need not be described herein. The significant issue for this particularly application is that in order to permit the laser to operate in the yellow and green light regions of the spectrum, a coating is required that will suppress the dominant red lines which strongly compete with the other yellow and green lines.

Where the mirrors 130 and 132 are used as the high reflectors, it is desirable that the reflectivity for the lines of interest be above ninety-nine percent. In order to suppress the competing lines, the reflectivity at those wavelengths should be below ninety percent (i.e. at least ten percent transmissive.) Thus, mirror 130 should be at least ninety-nine percent reflective at 647 nm and at least ten percent transmissive at 531 nm and 568 nm. Conversely, mirror 132 should be at least ninety-nine percent reflective at 531 nm and 568 nm and at least ten percent transmissive at 647 nm.

The operation of the subject system would be as follows. During set-up, the physician will determine which wavelength light is desirable and enter that information into the processor. For example, the physician might desire to use red light. In this case, the processor will signal the stepper motor 96 to rotate the cradle to the position shown in FIG. 5. At this position, mirror 130 is aligned with the optical axis of the laser and red light can be generated. For krypton gas, the predominant red wavelength is 647 nm.

In the preferred embodiment, a pick-off is used to monitor output power levels. If the power output is below a certain minimum level, the processor can adjust the angle of the frame 50 with respect to plate 44 using stepper motors 64 and 66 while monitoring the power. The processor operates to select the angle of the frame which provides the highest power. This angular adjustment of the frame (and hence mirror 130) will typically be performed in a diagnostic routine during initial set-up and should not have to be repeated unless something has happened to disturb the alignment of the laser.

If the physician then decides to use either green or yellow light (or a combination of both), the processor will signal stepper motor 96 to rotate the cradle to the position shown in FIG. 4. At this time, mirror 132 will be in alignment with the laser and the red light will be suppressed in favor of the green and yellow light which will lase simultaneously. For krypton gas, the predominant yellow line is at 568 nm while the predominant green line is at 531 nm with some power being generated in the green at 521 nm. If the physician desires to use either green light or yellow light alone, an optical dichroic filter 140 located beyond mirror 24 (FIG. 1) can be used to isolate the selected color.

If the physician wishes to return to using red light, the processor will simply switch the cradle back to the original position. As can be appreciated, the subject system is capable of selectively generating laser light in two competing wavelength regimes with only a single gain medium. In the preferred embodiment, wherein a krypton gas ion laser is used as the gain medium, the laser is capable of selectively generating both red and yellow/green light allowing for a range of ophthalmological treatments.

While the subject invention has been described with reference to a preferred embodiment, various changes and modifications could be made therein, by one skilled in the art, without varying from the scope and spirit of the subject invention as defined by the appended claims. For example, the optical assembly 12 can be used to mount and switch between optical elements other than mirrors. Other types of optical elements which might be used include windows or prisms.

We claim:

1. An assembly for selectively aligning first and second optical elements with an optical axis, comprising:
   a frame;
   a cradle mounted to said frame and being rotatable about a pivot axis, said pivot axis being perpendicular to the optical axis, said cradle being movable between first and second angular positions; and
   first and second means for mounting said optical elements onto said cradle in a non-coplanar manner, said means being configured such that when said cradle is in said first angular position, the first optical element is aligned with and perpendicular to the optical axis and when said cradle is in said second angular position, the second optical element is aligned with and perpendicular to the optical axis.

2. An assembly as recited in claim 1 wherein said cradle is hollow and wherein said mounting means is defined by a pair of angled surfaces formed on the end of said cradle opposite said pivot axis.

3. An assembly as recited in claim 2 further including a means for moving said cradle between said first and second positions.

4. An assembly as recited in claim 2 wherein said optical elements are mirrors each having a coating optimized to reflect different wavelength regions of light.

5. An assembly as recited in claim 1 wherein said pivot axis intersects the optical axis.

6. A laser assembly comprising:
   a gain medium having an optical axis;
   means for exciting the gain medium;
   an output coupler located along the optical axis at one end of the gain medium;

a first mirror having a coating optimized to reflect radiation in a first wavelength range;

a second mirror having a coating optimized to reflect radiation in a second wavelength range;

a frame located along the optical axis at the other end of the gain medium;

a cradle mounted to said frame and being rotatable about a pivot axis which is perpendicular to optical axis, said cradle being movable between first and second angular positions; and first and second means for mounting said first and second mirrors onto said cradle, said means being configured such that when said cradle is in said first angular position, the first mirror is aligned with the optical axis and when said cradle is in said second angular position, the second mirror is aligned with the optical axis.

7. A laser assembly as recited in claim 6 wherein said gain medium is mounted in a support structure and wherein said frame is adjustably mounted to said support structure.

8. An assembly as recited in claim 6 wherein said cradle is hollow and wherein said mounting means is defined by a pair of angled surfaces formed on the end of said cradle opposite said pivot axis.

9. An assembly as recited in claim 6 further including a means for moving said cradle between said first and second positions.

10. A laser assembly as recited in claim 6 wherein said pivot axis intersects the optical axis.

11. A laser assembly comprising:

a gas discharge tube containing a lasing gas and with one end thereof terminating in a flexible bellows;

means for exciting the lasing gas to create a gas discharge;

a primary mirror mounted adjacent the other end of the gas discharge tube;

an adjustable mirror assembly mounted at said one end of the gas discharge tube, said mirror assembly including:

a first mirror having a coating optimized to reflect radiation in a first wavelength range;

a second mirror having a coating optimized to reflect radiation in a second wavelength range;

a frame;

a cradle being connected to said bellows and supported by said frame, said cradle being rotatable about a pivot axis perpendicular to and intersecting bellows, said cradle being movable between first and second angular positions; and first and second means for mounting said mirrors onto said cradle, said means being configured such that when said cradle is in said first angular position, the first mirror is aligned with the optical axis such that a laser beam will be created consisting primarily of radiation in the first wavelength range and when said cradle is in said second angular position, the second mirror is aligned with the optical axis such that a laser beam will be created consisting primarily of radiation in the second wavelength range.

12. An assembly as recited in claim 11 wherein said cradle is hollow and wherein said mounting means is defined by a pair of angled surfaces formed on the end of said cradle opposite said pivot axis.

13. An assembly as recited in claim 11 further including a means for moving said cradle between said first and second positions.

14. A laser assembly as recited in claim 11 further including a support structure for holding said gas discharge tube, said support structure including a plate, and wherein said frame is adjustably mounted to said support structure.

15. A medical laser system comprising:

a krypton ion laser including a gas discharge tube;

a power supply connected to said discharge tube for exciting the krypton gas to create a laser beam;

a primary mirror mounted at one end of the discharge tube;

first and second movable mirrors mounted at the other end of the discharge tube, with the first mirror having a coating optimized to reflect red light and with the second mirror having a coating optimized to reflect yellow and green light; and control means for selectively positioning either the first or second movable mirrors into alignment with the optical axis of the discharge tube so that when first mirror is in optical alignment, the laser beam will consist primarily of red light and when the second mirror is in optical alignment the laser beam will consist primarily of yellow or green light.

16. A medical laser as recited in claim 15 wherein said primary mirror is an output coupler, and wherein said first mirror is at least ninety-nine percent reflective of radiation at 647 nm and at least ten percent transmissive at 531 nm and 568 nm and wherein said second mirror is at least ninety-nine percent reflective of radiation at 531 nm and 568 nm and at least ten percent transmissive at 647 nm.

17. A medical laser as recited in claim 16 further including a dichroic filter means selectively positionable beyond said output coupler mirror for selectively transmitting either 531 nm or 568 nm radiation when said second mirror is in alignment with the optical axis of the discharge tube.

18. A medical laser as recited in claim 15 further including a mirror assembly, said mirror assembly comprising:

a frame;

a cradle mounted to said frame and being rotatable about a pivot axis, said cradle being movable between first and second angular positions; and first and second means for mounting said first and second mirror onto said cradle, said means being configured such that when said cradle is in said first angular position, the first mirror is aligned with the optical axis of the discharge tube and when said cradle is in said second angular position, the second mirror is aligned with the optical axis of the discharge tube.

19. An assembly as recited in claim 18 wherein said cradle is hollow and wherein said mounting means is defined by a pair of angled surfaces formed on the end of said cradle opposite said pivot axis.

20. A medical laser as recited in claim 18 wherein said pivot axis is perpendicular to the optical axis of the discharge tube.

21. A medical laser as recited in claim 20 wherein said pivot axis intersects the optical axis of the discharge tube.

* * * * *